US006865265B1

United States Patent
Eikkula et al.

(10) Patent No.: US 6,865,265 B1
(45) Date of Patent: Mar. 8, 2005

(54) CALL CONTROL IN INTELLIGENT NETWORK

(75) Inventors: Jari Eikkula, Espoo (FI); Heikki Tuunanen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/856,367

(22) PCT Filed: Dec. 2, 1999

(86) PCT No.: PCT/FI99/00996

§ 371 (c)(1),
(2), (4) Date: May 22, 2001

(87) PCT Pub. No.: WO00/36848

PCT Pub. Date: Jun. 22, 2000

(30) Foreign Application Priority Data

Dec. 11, 1998 (FI) .................................................. 982694

(51) Int. Cl.⁷ ............................................... H04M 3/42
(52) U.S. Cl. .............................. 379/207.02; 379/221.08
(58) Field of Search ....................... 379/201.01, 201.02, 379/207.02, 207.04, 207.05, 207.12, 221.08, 221.13, 230

(56) References Cited

U.S. PATENT DOCUMENTS

| 5,771,279 A | | 6/1998 | Cheston, III et al. | |
| 5,867,570 A | * | 2/1999 | Bargout et al. | 379/221.13 |
| 6,047,055 A | * | 4/2000 | Carkner et al. | 379/221.13 |
| 6,101,250 A | * | 8/2000 | Tiainen | 379/207.02 |
| 6,526,134 B1 | * | 2/2003 | Wallenius | 379/201.01 |

FOREIGN PATENT DOCUMENTS

| WO | WO 97/33441 | 9/1997 |
| WO | WO 97/36431 | 10/1997 |
| WO | WO 98/44706 | 10/1998 |

* cited by examiner

*Primary Examiner*—Bing Q. Bui
(74) *Attorney, Agent, or Firm*—Pillsbury Winthrop LLP

(57) ABSTRACT

A method and intelligent network service switching point for transferring the execution of IN service related functionality from the originating half-call to the terminating half-call. For the functionality to be transferred, the service of a portion thereof is determined as a transferable service in the originating half-call. When the transferable service is encountered, information thereon is sent to the terminating half-call in which the is triggered.

13 Claims, 2 Drawing Sheets

FIG.1

CALL CONTROL IN INTELLIGENT NETWORK

This application is the National Phase of International Application PCT/FI99/00996 filed Dec. 2, 1999 which designated the U.S. and that International Application was Published under PCT Article 21(2) in English.

BACKGROUND OF THE INVENTION

The invention relates to services provided by an intelligent network and particularly to services provided on the terminating side of an intelligent network call.

A subscriber to a telecommunication network —a wired network or a mobile telephone network —can be provided with a variety of different services by the Intelligent Network (IN). The use of the Intelligent Network is based on call control and on the fact that the normal switching exchange connection arrangements and service control are separated from one another. ITU-T (International Telecommunications Union-Telecommunication Standardization sector) recommendation Q 1214 (10/95) describes a call setup arrangement, according to which exchanges supporting IN services comprise a basic call manager BCM. The basic call manager controls the basic call and the connection for providing the user with communication paths and interconnects these paths. BCM detects the events that can lead to invoking an IN service or that should be reported to an active IN service logic instance. The basic call manager BCM comprises a call-specific state model instance, a so-called basic call state model BCSM, which represents various phases of the call control and includes points where the call control can be interrupted in order to invoke an IN service. Additionally, BCM manages the use of exchange resources.

The IN call setup is divided into two sections: originating-side call setup and terminating-side call setup. The sections can also be called half-calls or call controls. The originating-side call control is associated with the services of a calling party, i.e subscriber A, and the terminating-side call control is associated with the services of a called party, i.e. subscriber B. The originating-side call control is modelled with an originating basic call state model O_BCSM and the terminating-side call control is modelled with a terminating basic call state model T_BCSM. The terminating basic call state model is invoked when the originating basic call state model reaches a point in routing, in which a routing address and call type are interpreted and the next route is selected. Thereafter, the originating basic call manager sends information on the call attempt to the terminating basic call manager to be further processed by a setup message. Upon receiving the message, the terminating basic call manager invokes the terminating basic call state model. These basic call state models interchange information by indications, but in the routing phase and while the call is active, the originating basic call state model does not send the terminating basic call state model other than the indication that a call has been attempted, which invokes the terminating basic call state model.

Interaction-points, so-called detection points, are determined in the basic call state models, where event handling is either interrupted, information is sent to the IN service control function and instructions are awaited from the IN control function, or alternatively, only a notification of what has happened is sent to the IN service control function. An IN service is provided such that when encountering service-related detection points, instructions are asked from the service control point. The first service-related query invokes at the control point a service logic program whose operation determines the instructions to be sent to the call control in order to provide a service.

Services offered by means of IN increase and become more and more versatile. A drawback with the above-described arrangement is that in feature interaction of various services, execution of another, simultaneous feature may be disturbed, since the services do not observe the difference in each other's features. Therefore, in some cases it would be advisable if a service detected in the originating half-call could be executed in the terminating half-call. In accordance with the prior art, this kind of a service cannot be invoked in the terminating half-call, since it is not possible to transfer sufficiently data from one half-call to another. These services are often related to services of the subscriber B. For instance, when number portability is implemented as an IN service in the mobile systems, problems arise with other IN service features, e.g. those developed for mobile telephone systems in accordance with CAMEL (Customised Applications for Mobile network Enhanced Logic) IN standard service facilities. The number portability means that the subscriber can change the operator and yet keep the old telephone number. In the present application the subscriber who has changed the operator but kept the old number is referred to as a ported subscriber.

There are situations, when it would be advisable for improved quality of service if the service logic, or a portion of it, which is normally invoked in the originating call model, is invoked on the terminating side. However, in the above-described arrangement this does not succeed, since the terminating call model is only related to the services of the subscriber B.

BRIEF DESCRIPTION OF THE INVENTION

The object of the invention is to provide a method and equipment implementing the method such that the above problem can be solved. This is achieved with the method and an intelligent network service switching point, which are characterized by what is disclosed in the independent claims. The preferred embodiments of the invention are disclosed in the dependent claims.

The invention is based on the idea that at least a portion of functionality relating to a specific service is transferred from an originating half-call to a terminating half-call. In other words, a need to invoke a service that is more suitable for the terminating half-call is detected in the originating half-call, and as a result the service is invoked in the terminating half-call. For instance, alternative logic call state models are determined for this purpose, and an activation message, which invokes creation of a terminating call state model instance, indicates the call state model according to which the instance will be created. The service control point sees the logic call state models as different ones, even though, in reality, there is only one terminating call state model, which comprises for each transferable service at least a detection point that triggers a service. In the present application, the concept of transferable service refers to a service that is detected in the originating half-call but executed partly or completely in the terminating half-call. More precisely, a transferable service refers to that portion of the service detected in the originating half-call which will be executed in the terminating half-call.

An advantage with the method and switching point of the invention is that interaction problems can be minimized and the quality of some services can be improved, when the service, or a portion of it, can be executed in the terminating half-call.

In one preferred embodiment of the invention, information on a transferable service is sent in an indication that invokes the terminating-side call control. This has the advantage that information can be transmitted by current data transmission mechanisms and no new mechanisms are needed.

In one preferred embodiment of the invention, the transferable service is the number portability. Not invoking this service until in the terminating half-call the advantage is achieved that the originating half-call can be controlled from a different IN service control point than the terminating half-call such that instructions given by different control points need not interact. For instance, the number portability service does not affect the subscriber B number which is seen in the originating half-call.

BRIEF DESCRIPTION OF THE DRAWINGS

In the following, the invention will be described in greater detail in connection with preferred embodiments with reference to the attached drawings, in which.

DETAILED DESCRIPTION OF THE INVENTION

The invention and its background will be described in the following by using the CorelNAP terminology of the standard ETS 300 374-1, but the invention can also be applied to intelligent networks implemented by other IN standards, such as ANSI, AIN, WIN or CAMEL. In the present application, the intelligent network also refers to other application platforms providing services of corresponding type. Use of IN control principles means here that in a network node either event handling is interrupted, information is sent to IN service control function SCF and instructions are awaited from the IN control function, or alternatively, only information on what has happened is sent to the IN service control function SCF.

Figure 1:
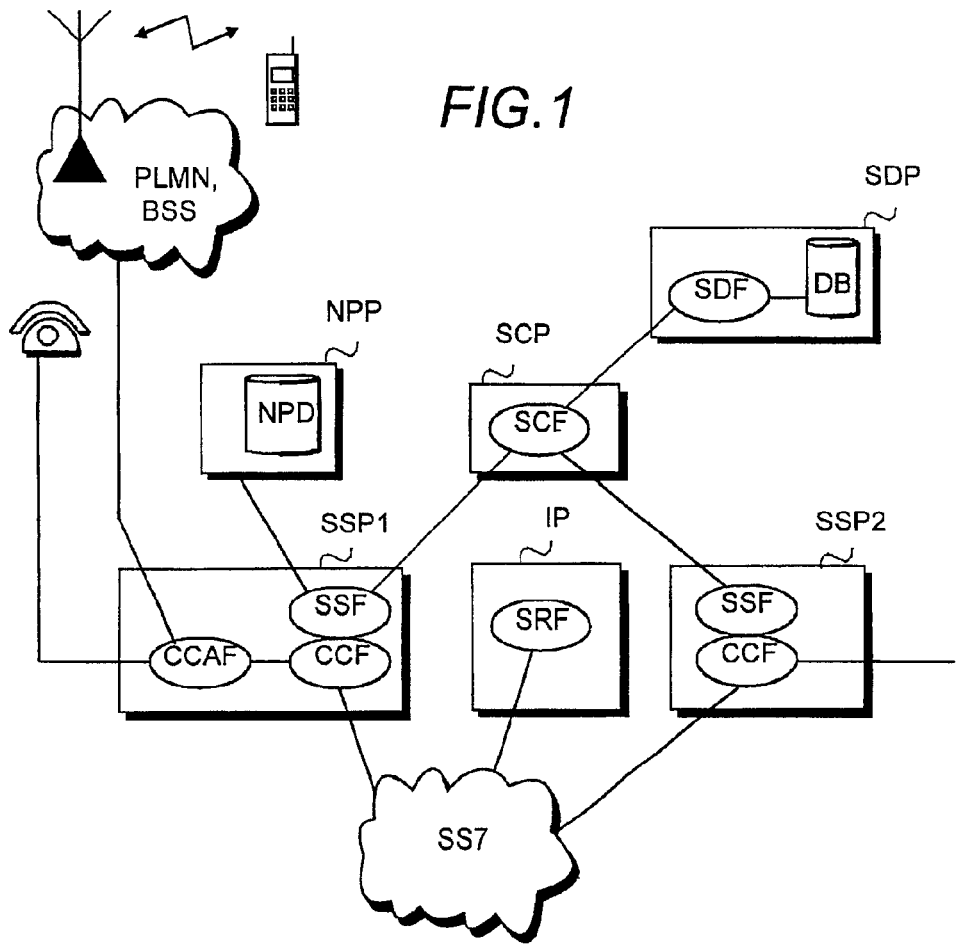
FIG. 1 illustrates an intelligent network.

FIG. 1 shows an intelligent network IN and a few examples of the relating telecommunication systems. FIG. 1 shows elements and functions that are essential to the IN services. Network elements SSP1 and SSP2, which comprise a service switching function SSF and a call control function CCF, are called service switching points SSP. The call control function CCF is not an IN-related function, but it is a standard switching centre function comprising high-level call processing functions, such as establishment and release of transmission connections. The service switching function SSF is an interface between the call control function CCF and the service control function SCF. SSF interprets requests sent by SCF and forwards them to CCF, which starts the required call control functions. Correspondingly, the call control function CCF uses SSF for asking instructions from SCF. SSF is tightly coupled to CCF whose interface it is. So each SSF together with CCF is located at the same switching centre. Within the scope of the present invention, the service switching point SSP is equal in value to the functional entity formed by CCF and SSF, and hereinafter the term SSP will be used. At the service switching point of the invention, at least two different terminating control records can be determined, one of which is of the prior art and the other is a control record customized to a service or services. One example of this is given in FIG. 4. Together with the customized control record, or as an alternative thereto, various triggering detection points (or other corresponding events) can also be determined for the services that are desired to be executed on the terminating side. Triggering detection points are described in greater detail in FIG. 4.

Network elements that include the service control function SCF are called service control points SCP. The service control function is a centralized authority in the intelligent network, which comprises an execution environment for service logic programs, among other things. Within the scope of the present application, SCF and SCP are equal in value, and hereinafter the term SCP will be used. In connection with an IN service, a service logic program is invoked at the service control point SCP, the operation of said program determining the instructions that SCP sends to SSP in each call step. Each program can have a plurality of instances to be executed. The service control point SCP of FIG. 1 shows the service control point at its simplest, since it only comprises the service control function SCF and the necessary couplings.

FIG. 1 also shows a node NPP (Number Portability Point) customized for the number portability service control, the node comprising a database NPO (Number Portability Data) and the necessary control functions for providing the number portability service. It is thus a kind of service control point and within the scope of the present application it is functionally equal in value with the service control point. The basic idea of the invention can also be implemented without customized nodes.

A service data function SDF is a database that SCF uses. The service logic programs can enquire and update SDF data. For instance, subscriber-specific or service-number-specific data can be stored in SDF. SDF can be either a database management system at the service control point SCP, or, as shown in FIG. 1, a separate database point SDP (Service Data Point) which supports the SCF-SDF interface and comprises a database DB.

A specialised resource function SRF of the intelligent network is an interface of such network mechanisms that are associated with subscriber interaction. SRF can be related to intelligent peripherals IP, which comprise more developed speech processing functions than the switching centres, or it can be located at the service switching point SSP.

FIG. 1 further shows that one service switching point SSP1 comprises a function CCAF (Call Control Agent Function) that provides the users with access to the network. Since SSP1 comprises CCAF, it can be e.g. a local exchange of the wired network or a mobile services switching centre controlling a base station sub-system BSS of the mobile telephone network PLMN. CCAF can also be located at an exchange that does not have the service switching function SSF.

In FIG. 1, the network elements are interconnected by means of a signalling network SS7. Also other networks, such as ISDN or IP, can be used.

The functionality of the invention can be implemented in current network elements, since they comprise processors and memory, by means of which it is possible to determine and program the detection of transferable services in the originating half-call, the transfer of information on the transferable service to the terminating half-call and the execution of service in the terminating half-call, for instance, utilizing various logic call state models. As it was stated earlier, the service control point sees the logic call state models as different ones, even though in reality there is only one terminating-side call state model which includes at least a service-triggering detection point for each transferable service.

Figure 2:
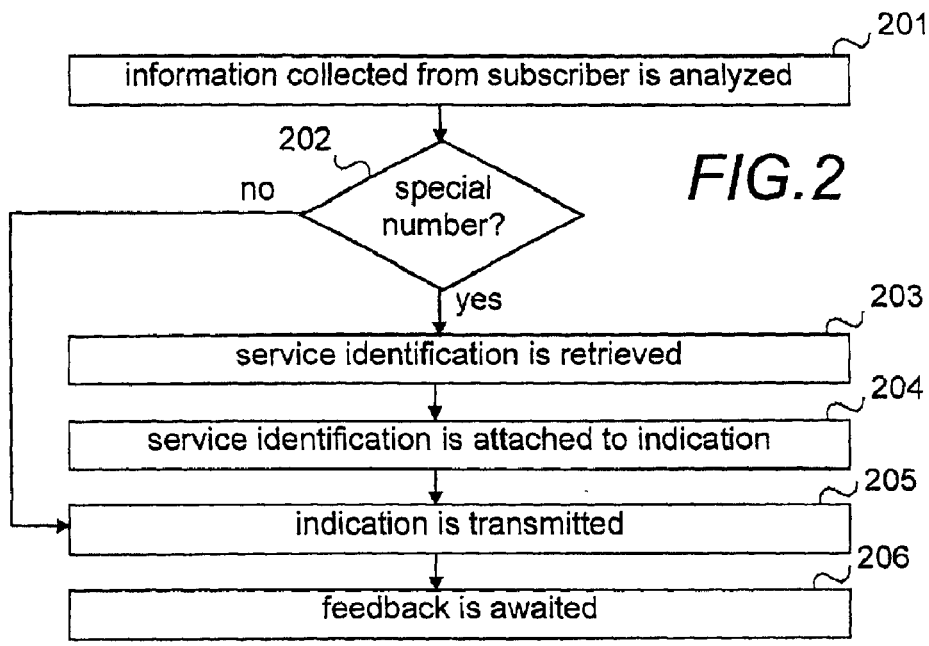
FIG. 2 is a flow chart of originating-side call control in accordance with a first preferred embodiment of the invention.

FIG. 2 illustrates operation of the originating call control in accordance with a first preferred embodiment of the invention. The starting point is step 201 where information collected from the subscriber is analysed for further call routing. In step 202, it is checked whether the collected information included a special number. A special number is a number associated with a predefined service. A predefined service is a transferable service, such as a number portability service, that is detected in the originating half-call but executed in the terminating half-call. A special number can be, for instance, the number of a ported subscriber B. A plurality of special numbers and services can be determined. If the information collected from the subscriber included a special number, i.e. a number associated with a specific service, a service identification corresponding the special number is retrieved in step 203 and attached in step 204 to an indication that is sent to the terminating side in step 205. For instance, if the special number is the number of a ported subscriber B, a Mobile Number Portability Service Identification MNPSI is attached to the indication. The indication to be sent is preferably a call attempt indication, which invokes the terminating call control. Thereafter, feedback is awaited from the terminating side, for instance, information that the called party does not answer.

If the collected information did not include the special number, a direct transition from step 202 to step 205 is made in order to send the indication.

In the first preferred embodiment, information on a 'special case' is added to the call attempt indication, i.e. information on the service or a portion of it being executed in the terminating half-call. An advantage with this is that the existing indications can be utilized. In addition, when the indication remains in accordance with the prior art, it leads to using the prior art terminating basic call state model, whereas a changed indication leads to using another basic call state model. It is also possible to always include information on the call state model used in the indication, and consequently, when a prior art call state model is needed, a Normal Service Identification NSI, for example, is added to the indication.

In the example of FIG. 2, the special case was detected on analysing the number. It could also be detected on the basis of the call origin, for instance. The use of number analysis for detecting special cases enables the use of a variety of methods for different number spaces. By means of the methods it is possible to control at what stage an IN service is invoked, for instance. A need for a number portability service can be detected at two different points. For instance, a Query on Release QoR list could comprise the numbers of own subscribers and/or number spaces from which some of the subscribers have moved over to another operator and kept their old numbers, and those numbers of other networks and/or number spaces whose subscribers may have moved over to another operator and kept their old numbers could be put on a Query on Digit Analysis QoD list. The subscriber on the QoR list invokes the IN service of 'number portability' only after the home location register has ceased to identify the subscriber. If the home location register identifies the subscriber, the IN service is not invoked. The subscriber on the QoD list always invokes the IN service.

Figure 3:
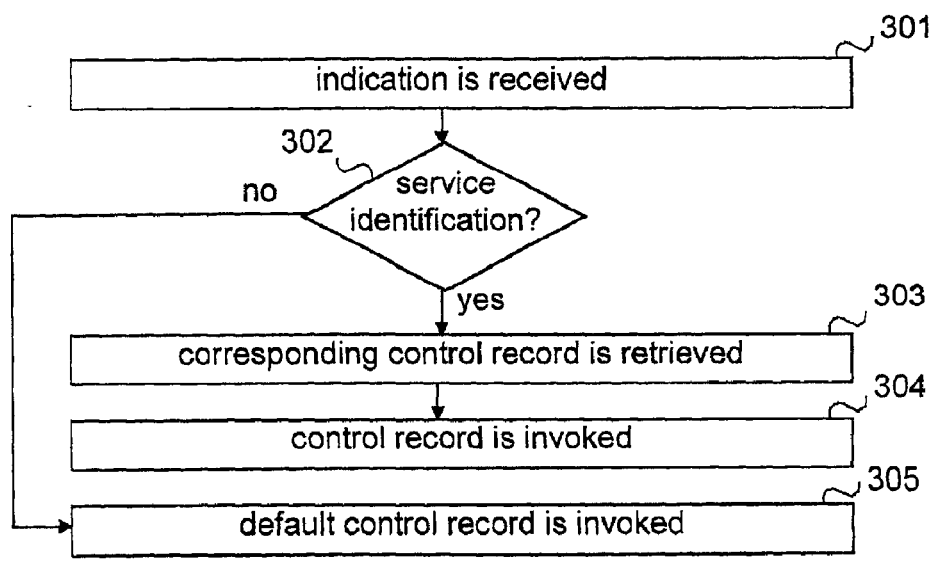
FIG. 3 is a flow chart of terminating-side call control in accordance with a first preferred embodiment of the invention.

FIG. 3 illustrates call control of the terminating-side in accordance with the first preferred embodiment of the invention. In step 301, an indication invoking the call state model is received and in step 302 it is checked whether the indication included a service identification. If the indication included the service identification, for instance MNPSI, it is investigated in step 303 which control record corresponds to the service identification and the control record indicated by the service identification is invoked in step 304. If the indication did not include the service identification, a prior art default control record is invoked in step 305. The invocation of the control record enables invocation of service-related service logic (at a detection point determined by the terminating state model), and later on, execution of the service logic at the service control point (or at a customized point comparable thereto).

In the embodiments, which only employ two different terminating-side control records, step 303 is not required at all, but the other control record that is not the default control record is invoked in step 304.

In the embodiments, in which the use of prior art control record is indicated, for instance, by adding NSI to the indication, checking in step 302 is not required and step 305 is included in step 304.

The flow charts of FIGS. 2 and 3 illustrate the invention and the principles presented therein can also be applied to other services than the number portability. The checks to be executed and their position in the flow chart naturally depend on how the special conditions are determined and what they are related to. A service can also be indicated indirectly by arranging a trigger detection point on the terminating side, for instance, with a dedicated indication message or with an indication message that invokes the terminating half-call. Detection points and arming are described in greater detail in FIG. 4. On given conditions it is possible that the same call can invoke a plurality of simultaneous, different terminating-side call state models. However, the service control point detects these models as separate ones. For instance, if the subscriber B is not ported, i.e. his number is in the 'correct' number space of his operator, both the prior art default call control record and the control record determined to comprise the number portability can be invoked. The service control point detects these control records as separate ones, even though, from the viewpoint of the call control, they are one terminating control record.

Figure 4:
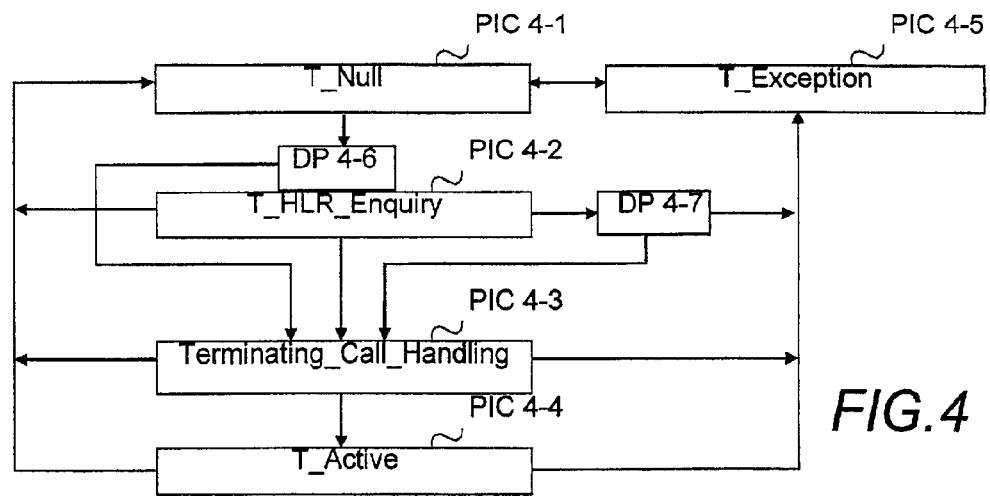
FIG. 4 shows a call state model associated with number portability.

FIG. 4 shows an example of a terminating control record. It relates to the number portability. The example illustrates SSP actions during the terminating call processing. The description assumes that SSP is a mobile network switching centre of the Pan-European digital mobile system GSM (Global System for Mobile Communications) by which the actions in various points are described. It is further assumed that the service relating to the control record is the number portability. The control record is modelled with a call state model, in the same way as in the ITU-T recommendation Q 1214 a call control record is modelled in the switching point SSP with an originating basic call state model and a terminating basic call state model. The reason why the call has to be modelled is that in order to be able to control the call setup in SSP, SCP has to know the call phase. By means of modelling, both SSP and SCP implicitly know the call phases and potential interaction points, so-called detection points DP, in which SCP can affect the call. It is checked in detection points whether given conditions that are determined in the detection point are fulfilled. When a call attempt progresses to a detection point DP, the MSC/SSP makes an SCP enquiry in the following cases:

DP is a trigger detection point TDP and triggering criteria are met (in other words, SSP can make an initial enquiry to SCP in a TDP detection point where it receives instructions for a call setup or for continuing the call setup. The trigger detection point is a point which can trigger transmission of an initial message in SSP, which message leads to invocation of the service logic in the service control point. A specific triggering condition can trigger only one service logic program at a time;

DP is an event detection point EDP, in which SCP is interested. SCP gives instructions on EDPs to be reported for each call separately, in other words, it arms the detection points it is interested in.

There are two determined EDP and TDP types: 'Request' and 'Notification'. When SSP makes an SCP enquiry in a detection point DP of 'Request' type, the call processing must be interrupted and a reply from SCP must be awaited. In connection with 'Notification', SSP sends a notification in the detection point and does not interrupt the call processing nor awaits a reply.

In state models, the call processing procedures to be executed in SSP are roughly grouped in phases, which are called 'points in call' PIC. When a phase PIC ends, a detection point DP is generally encountered. The call setup or release can be temporarily interrupted in these detection points and the service control point SCP can be asked for further call processing instructions. Call management can be transferred in these detection points to the service control point. When a transition is made from the detection point DP to the phase PIC, the call management moves over to the switching point. In addition to PICs and DPs, the basic call state model BCSM comprises transitions and events. The transitions indicate the flow of the basic call connection processing from one PIC to another. The events cause transitions into and out of the phase PIC. Different call state models of the same call (i.e. O_BCSM and T_BCSM) interchange information on the call process by indications. Information on a call attempt and how it is answered is mainly conveyed by means of said indications.

The call state model of FIG. 4 shows the points in call, in which service logic instances of an operator-specific service are allowed to interact with the basic call control. In the example of FIG. 4, the number portability is the operator-specific service, and the service logic instances are accessed through a service-related database NPD (Mobile Number Portability Database). In the following, the numeral refers to the point in call PIC or the detection point DP in FIG. 4.

With reference to FIG. 4, in PIC 4-1 of the call state model information on a call attempt is received (for instance, Initial Address Message IAM is received) and the information is analysed, a service identification MNPSI is received and analysed. Exit events of the point include either completing the MNPSI analysis, after which a transition to the detection point DP 4-6 is made, or encountering an exception event, after which a direct transition to PIC 4-5 is made. If an exception event is encountered in PIC 4-1, SCP is not notified thereof, since the corresponding detection point is missing.

There are two entry events of PIC 4-2 (T_HLR_ Enquiry). The first one (through detection point DP 4-6) is: MNPSI is analysed and the telephone number of the called party, i.e. subscriber B, is not ported (i.e. the subscriber has not changed the operator keeping the number of his old operator). The second one is that DP 4-6 is not active and an enquiry from the home location register HLR, which maintains mobile network subscriber information, is necessary. In PIC 4-2, a routing data enquiry is sent to the home location register HLR. In the simplest model, it is the only action. Exit events of PIC 4-2 include an indication of the subscriber information being received from the home location register, an indication of the subscriber information not being received from the home location register (for instance, information on the subscriber being unknown is received), the calling party terminates/abandons the call and finally an exit event of encountering an exception condition. If the subscriber information was received from the home location register, a transition to PIC 43 is made. If the subscriber information was not received from the home-location register, a transition to DP 4-7 is made. If the calling party, i.e. subscriber A, abandons the call, a transition to PIC 4-1 is made. If an exception event is encountered, a direct transition to PIC 4-5 is made. If an exception event is encountered in PIC 4-2, SCP is not informed thereon either, since the corresponding detection point is missing. Exception events include all such failures that prevent said 'normal' exit events from being encountered.

There are four entry events in PIC 4-3 of the call state model (T_Terminating_Call_Handling): subscriber information received from the home location register is analysed (in PIC 4-2); detection point DP 4-6 is not active and an enquiry from the home location register HLR is not needed; MNSPI is analysed (in DP 4-6), the called party number is not ported and no enquiry from the home location register HLR is needed; MNSPI is analysed (in DP 4-6 and DP 4-7), the called party number is ported. In PIC 4-3 the response received from the home location register HLR (i.e. the subscriber information) is analysed. In addition, the routing address and the call type are interpreted and the next route, if necessary, will be selected. If the called party number is ported, a new terminating call control instance is invoked in order to find a route to the network of a new operator. In addition, the terminating party, i.e. subscriber B, is alerted and his answer to the call is awaited. Moreover, the GSM supplementary service of call forwarding is invoked, if necessary.

Exit events of PIC 4-3 include the following: the call is accepted and answered; the calling party terminates the call and an exception event is encountered. If the call is answered, a transition to PIC 44 is made. If the calling party terminates the call, a transition to PIC 4-1 is made. If an exception event is encountered, a direct transition to PIC 4-5 is made. If an exception event is encountered in PIC 4-3, SCP is not informed thereon, since the corresponding detection point is missing. Exception events comprise all such events that prevent said 'normal' exit events from being encountered.

An entry event of PIC 44 (T_Active) is an indication that the call is accepted and answered by the subscriber B. In PIC 44, a connection is established between the calling party and the called party. Call supervision is provided and call release is awaited. Exit events of PIC 4—4 include receiving a disconnection indication from either one of the parties and encountering an exception event. If the disconnection indication is received, a transition to PIC 4-1 is made. If the exception event is encountered, a direct transition to PIC 4-5 is made. If the exception event is encountered in PIC 4—4, SCP is not informed thereon, since the corresponding detection point is missing. Exception events comprise all such failures that prevent the first mentioned 'normal' exit event from being encountered.

Entry events of PIC 4-5 (T_Exception) include encountering the above-described exception events. In addition, entry event include all such failures that prevent other exit events of the point from being encountered. The point provides default handling of error conditions, by means of which it is ensured that e.g. no resources will remain inappropriately allocated, that is to say, all unnecessary resources will be released. For instance, if there is a connection from SCP to the database NPD, information on the failure is transmitted, the connection is disconnected and it is indicated that none of the non-executed/uncompleted call handling instructions will be completed. SSP should utilize vendor-specific procedures to ensure in SSP that all lines and inter-exchange circuits are made available to new calls. The exit event of PIC 4-5 is that the default handling of exception conditions is completed. This leads to PIC 4-1.

Both detection points of the call state model illustrated in FIG. 4 are trigger detection points and of the type R, i.e. Request. By means of the detection point 4-6 it is indicated that the reception point of the MNPSI service identification is encountered and MNPSI that is possibly received is analysed. By means of the detection point 4-7 it is possible to indicate that HLR did not find the necessary subscriber data in its database.

The call state model shown in FIG. 4 illustrates only one possible solution and it is only related to one IN service. Said model is intended to illustrate establishment of service-specific IN models. The points described therein may also comprise other functions, more detection points can be determined, likewise more PICs can be added. It is obvious to the person skilled in the art that as technology progresses the basic idea of the invention can be implemented in a variety of ways. Thus the invention and its embodiments are not restricted to the above-described examples but they can vary within the scope of the claims.

What is claimed is:

1. A method for producing an intelligent network service, in which method:
   call control is divided into originating call control and terminating call control;
   event handling of a call is controlled by an originating control record and a terminating control record, each control record having an operational connection to at least one intelligent network service control function for producing the intelligent network service;
   wherein a service or a portion thereof is determined in the originating control record to be a transferable service;
   the transferable service is detected in the originating call control;
   an indication, which includes an expression of the detected transferable service, is transmitted from the originating call control to the terminating call control;
   an event related to the transferable service is set in the terminating call control as an intelligent network event that triggers the service, and
   wherein control records are modeled with state models.

2. A method as claimed in claim 1, wherein the service is triggered on the terminating side in response to reception of said expression.

3. A method as claimed in claim 1 wherein said expression is included in the indication that invokes the terminating call control.

4. A method as claimed in claim 3, wherein at least one other terminating control record is determined and the control record to be invoked is selected on the basis of the expression included in the indication.

5. A method as claimed in claim 1 wherein the service is the number portability service.

6. A method as claimed in claim 5, wherein a dedicated terminating control record is determined for the number portability service, and it is selected to be the control record that is invoked in response to the number portability service expression included in the indication.

7. An intelligent network service switching point, which is arranged to divide call control into originating call control and terminating call control, both call controls having an operational connection to at least one intelligent network service control function for producing an intelligent network service,
   wherein event handling of a call is controlled by an originating control record and a terminating control record corresponding respectively to originating call control and terminating call control,
   wherein the intelligent network service switching point is arranged to identify a service to be transferred from the originating call control to the terminating call control and to transfer the execution of the service to the terminating call control in response to the identification, and
   wherein the originating and terminating control records are modeled with state models.

8. An intelligent network service switching point as claimed in claim 7, wherein the originating call control is arranged to transmit an indication of the transferable service to the terminating call control in response to the identification, and the terminating call control is arranged to trigger the service in response to the indication.

9. An intelligent network service switching point as claimed in claim 7 or 8, wherein the terminating call control is arranged to execute the terminating call control at least in two different ways, to select one of said ways expressed in the indication received from the originating call control and to invoke the selected way in response to the reception of the indication.

10. An intelligent network service switching point as claimed in claim 7 or 8, wherein the intelligent network service switching point is arranged to identify a service related to number portability as a transferable service.

11. An intelligent network service switching point as claimed in claim 10, wherein the terminating call control is arranged to invoke the service in a node customized for the number portability service control in response to the transferred service.

12. A method for producing an intelligent network service, the method comprising:
   dividing call control into originating call control and terminating call control;
   controlling event handling of a call by an originating control record and a terminating control record, each control record having an operational connection to at least one intelligent network service control function for producing the intelligent network service, wherein a service or a portion thereof is determined to be a transferable service based on the originating control record;
   transmitting an indication, which includes an expression of a detected transferable service, from the originating call control to the terminating call control;
   setting an event related to the detected transferable service in the terminating call control as an intelligent network event that triggers the service; and
   invoking the terminating call control based on the indication including the expression of the detected transferable service,
   wherein at least one other terminating control record is determined and the control record to be invoked is selected on the basis of the expression included in the indication.

13. An intelligent network service switching point, which is arranged to divide call control into originating call control and terminating call control, both call controls having an operational connection to at least one intelligent network service control function for producing an intelligent network service, wherein the intelligent network service switching point is arranged to identify the service to be transferred from the originating call control to the terminating call control based on an indication, which includes an expression of the service to be transferred, and to transfer the execution of that service to the terminating call control in response to the identification, and wherein the indication invokes the terminating call control, at least one other terminating control record is determined and the control record to be invoked is selected on the basis of the expression included in the indication.

* * * * *